United States Patent [19]

Lin

[11] Patent Number: 4,459,714
[45] Date of Patent: Jul. 17, 1984

[54] MULTI-FUNCTION CUSHION AND ITS ASSEMBLIES

[76] Inventor: Jinn P. Lin, No. 7, Lane 85, Jiing Shing Rd., Taipei, Taiwan

[21] Appl. No.: 298,254

[22] Filed: Aug. 31, 1981

[51] Int. Cl.³ .................... A47C 27/10; A47G 9/00
[52] U.S. Cl. ................................. 5/455; 5/441;
5/451; 5/457; 5/465; 24/237; 24/241 S;
297/DIG. 3
[58] Field of Search ............ 5/441, 449, 450, 453–456,
5/457, 458, 465; 297/DIG. 3; 70/459; 24/231,
238, 224, 230 AK, 225, 237, 241 S, 255 SL

[56] References Cited

U.S. PATENT DOCUMENTS

| | | | |
|---|---|---|---|
| 691,433 | 1/1902 | Baker | 70/459 |
| 2,582,439 | 1/1952 | Kavanagh | 5/455 |
| 2,919,747 | 1/1960 | Post | 5/457 |
| 3,029,109 | 4/1962 | Nail | 297/DIG. 3 |
| 3,112,956 | 12/1963 | Shick et al. | 5/455 |
| 3,572,836 | 3/1971 | Khanh | 5/455 |
| 3,892,015 | 7/1975 | Taylor | 24/225 |
| 3,918,110 | 11/1975 | Cantillo et al. | 5/455 |
| 4,148,521 | 4/1979 | Hook | 5/455 |
| 4,277,434 | 7/1981 | Conway | 24/237 |
| 4,370,769 | 2/1983 | Herzig et al. | 5/452 |

FOREIGN PATENT DOCUMENTS

| | | | |
|---|---|---|---|
| 206139 | 4/1959 | Austria | 24/237 |
| 423109 | 4/1911 | France | 24/238 |
| 604642 | 9/1978 | Switzerland | 24/237 |

Primary Examiner—Alexander Grosz

[57] ABSTRACT

This invention provides a multi-function cushion and its assemblies, which is made of a tough and flexible plastic cloth being soldered together with supersonic (or high frequency) wave heating means to form a suitable geometric shape. On the circumference, some lugs with assembling hole are furnished. After being filled with air or water, said cushion will become an air cushion or water cushion to be used on the water or the land; in addition, a plural number of said cushions may be assembled together with hook ring, or link and cord to form various shapes for many purposes.

1 Claim, 30 Drawing Figures

MULTI-FUNCTION CUSHION AND ITS ASSEMBLIES

BACKGROUND OF THE INVENTION

Now, the plastic has become a widely used material. In our daily life, many of our activities, such as, eating, clothing, housing, transportation, education, and recreation have had close relationship with plastics. As a result of the continuous technical advance, many items used to be made of metal or other materials have been made of plastic materials instead. This invention is also a product made of plastics, having many different functions with a single item.

BRIEF DESCRIPTION OF THE DRAWINGS

FIG. 2-A & 2-B show the assembling hole on the lug.

FIG. 3-A thru 3-E show the various embodiments in this invention.

FIG. 5, 5-1, & 5-2 show the structure of a link in this invention.

FIG. 6 shows an assembled view of two square-shaped cushions of this invention.

FIG. 8 & 8-1 show an assembled view of a plural number of cushions in different shape.

FIG. 11-1, & 11-2 show the life-jacket embodiments of this invention.

FIG. 13-1, & 13-2 show the assembled embodiments of this invention as a sun-shade (to be on the water or the land).

FIG. 17, & 17-1 show an embodiment filled with both air and water.

FIG. 18 shows an embodiment of intake of this invention.

DETAILED DESCRIPTION

Figures 1, 2:
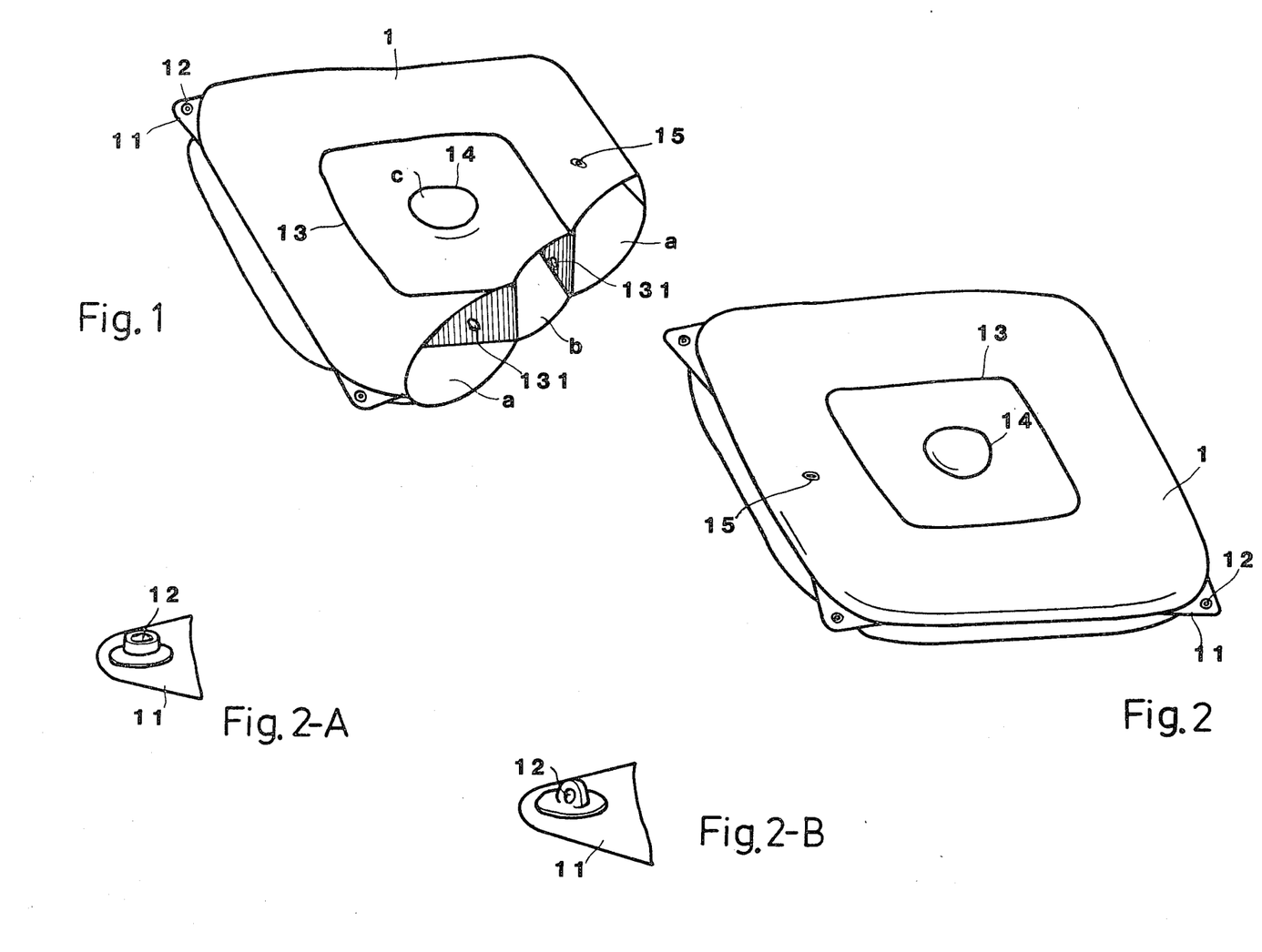
FIG. 1 shows a sectional view of a square embodiment of this invention.
FIG. 2 shows an isometric view of this invention.

This invention is further described in detail, together with the drawings, as follows:

FIG. 1 shows a sectional view of a square embodiment of this invention, which is made of two layers of tough and flexible plastic cloth being soldered together with a supersonic (or high frequency) heating means to form a cushion unit (1). Around its circumference, some lugs (11) with assembling hole (12) are furnished; inside the cushion unit (1), a square I-beam band (13) and a round I-beam band (14) are provided to partition said cushion unit (1) into three air chambers (a,b,c), and one each of said I-beam bands (13,14), some thru holes (131) are provided so as to let the air or water in said chambers flowing around.

Figure 3:
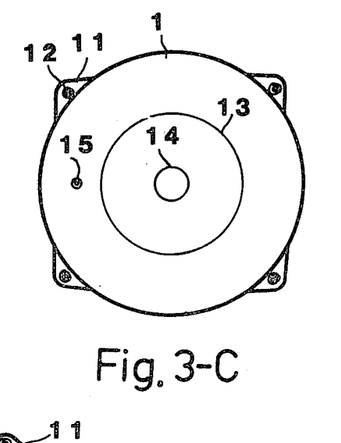

In general, the cushion unit (1) of FIG. 1 will have perfect elasticity when filled with about 85–90% air or water; because of the square I-beam band (13) being furnished inside the cushion unit, the internal impact force of said cushion can be adjusted, and the cushion can be maintained in a stable state whenever a pressure being applied to it. Upon being filled with air or water, the round I-beam band (14) will have the cushion become a concave basin shape, and whenever a pressure being applied to it, a vacuum absorbing force will be generated between a plane surface and the cushion surface so as to have said cushion adhered to a plane tightly; the aforesaid absorbing effect would prevent the cushion from moving when a person sitting or lying on it, or when a kid playing on it; otherwise, the kid may be stumbled over it, and might get injured. In addition, the intake (15) furnished on the cushion unit (1) is used for filling air or water. FIG. 2 shows an isometric view of this invention filled with air or water. FIG. 3-A thru 3-E show the various embodiments in this invention. In real manufacturing, the size of said embodiments may be varied so as to provide multiple choice to the user. Moreover, the I-beam bands (13&14) may also be carefully designed to match with the cushion color and shape for beautifying the whole cushion unit.

Figures 4, 7:
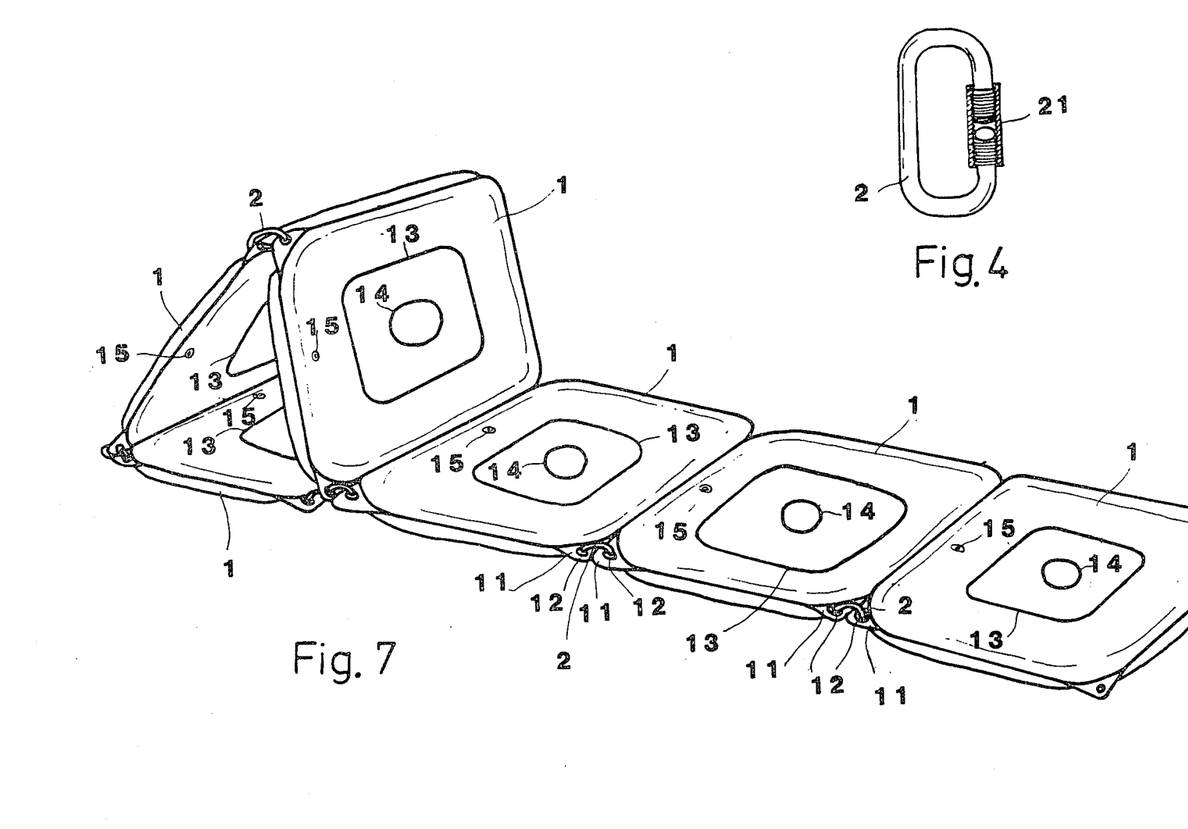
FIG. 4 shows an embodiment of the hook ring in this invention.
FIG. 7 shows an assembled view of a plural number of square-shaped cushions of this invention.
Figures 5, 6:
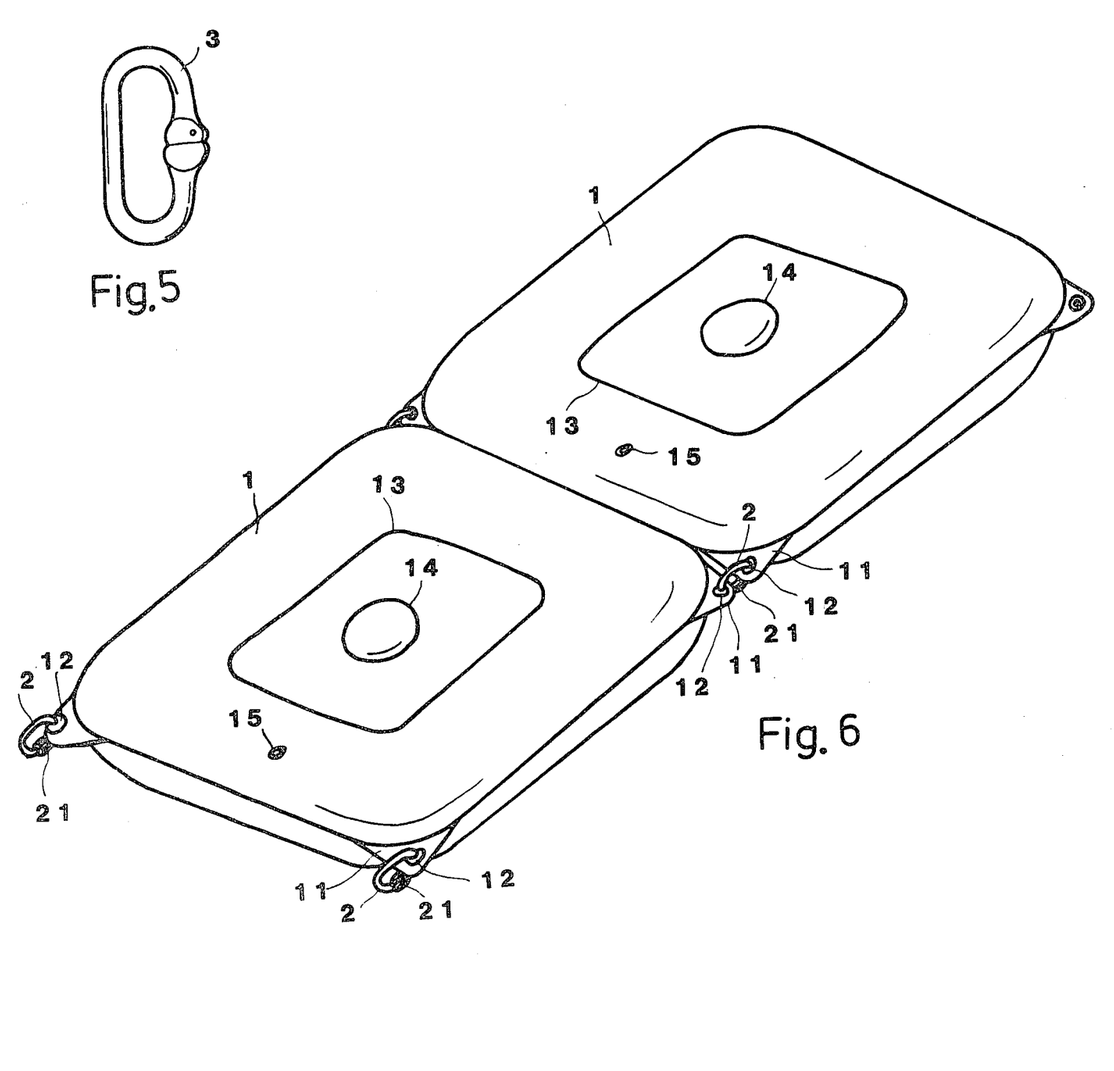
Figures 8, 81:
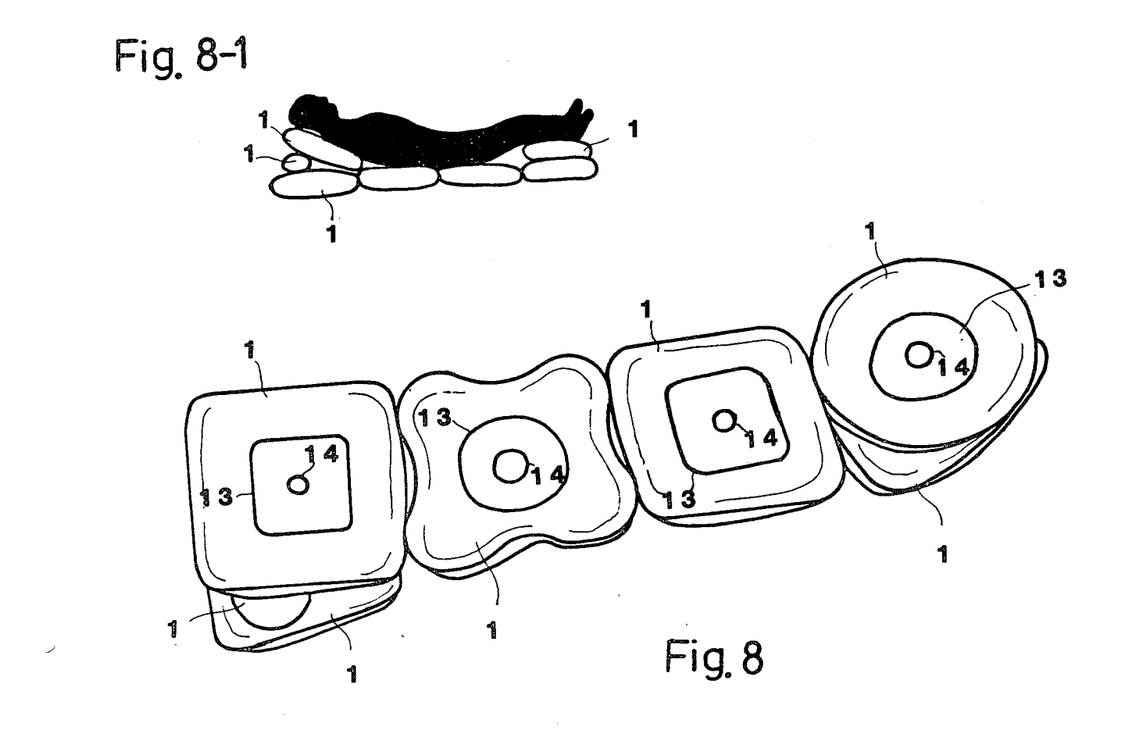
Figure 9:
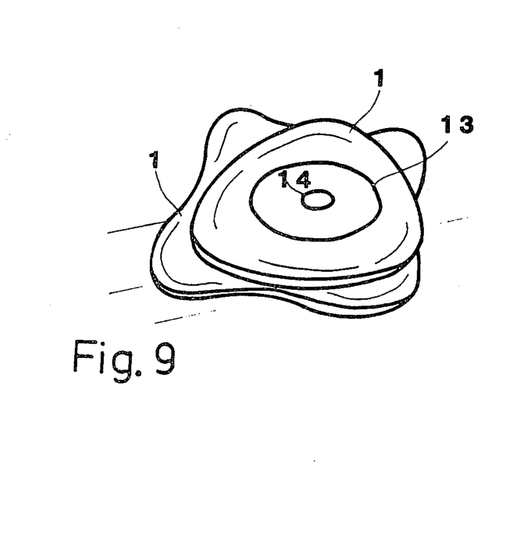
FIG. 9 shows an assembly embodiment of this invention.
Figure 10:
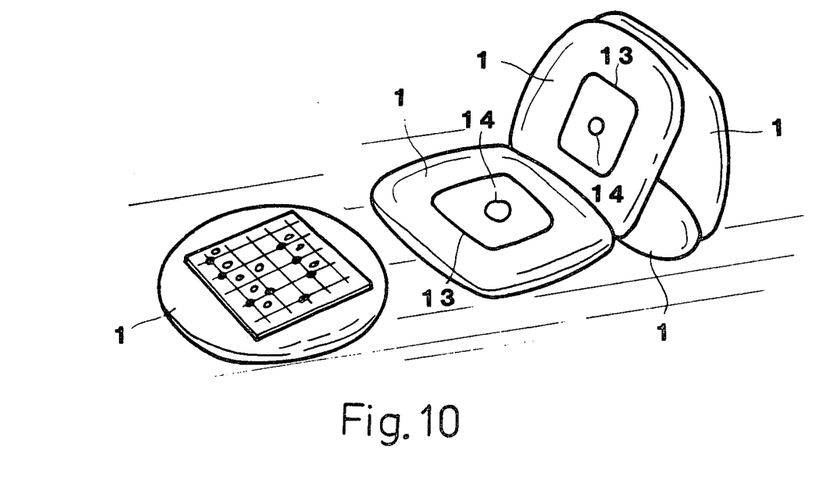
FIG. 10 shows a plural number of assemblies with cushions in different shape for different purpose.
Figure 12:
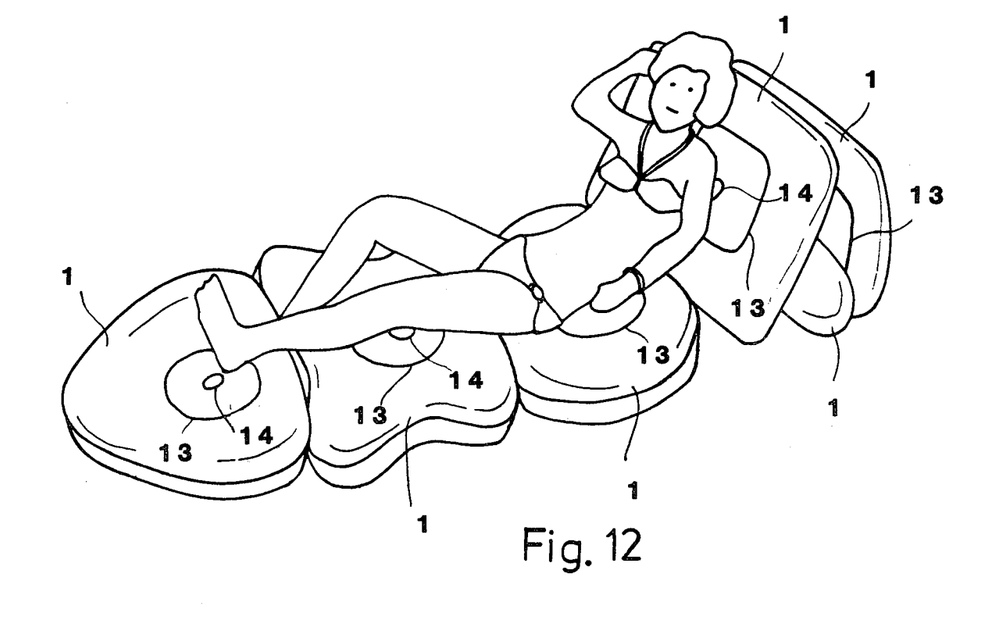
FIG. 12 shows an assembled embodiment with a plural number of cushions in different shape.
Figure 14:
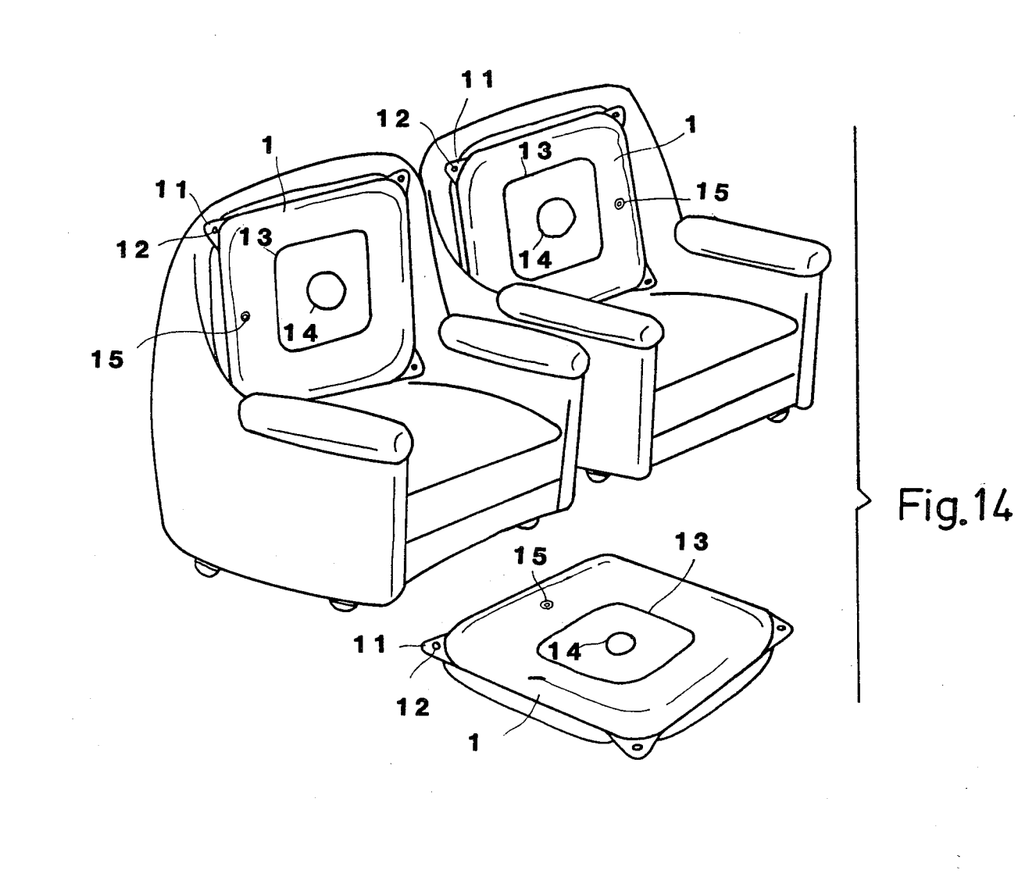
FIG. 14 shows an embodiment of this invention being used as a chair cushion and a foot cushion.
Figure 15:
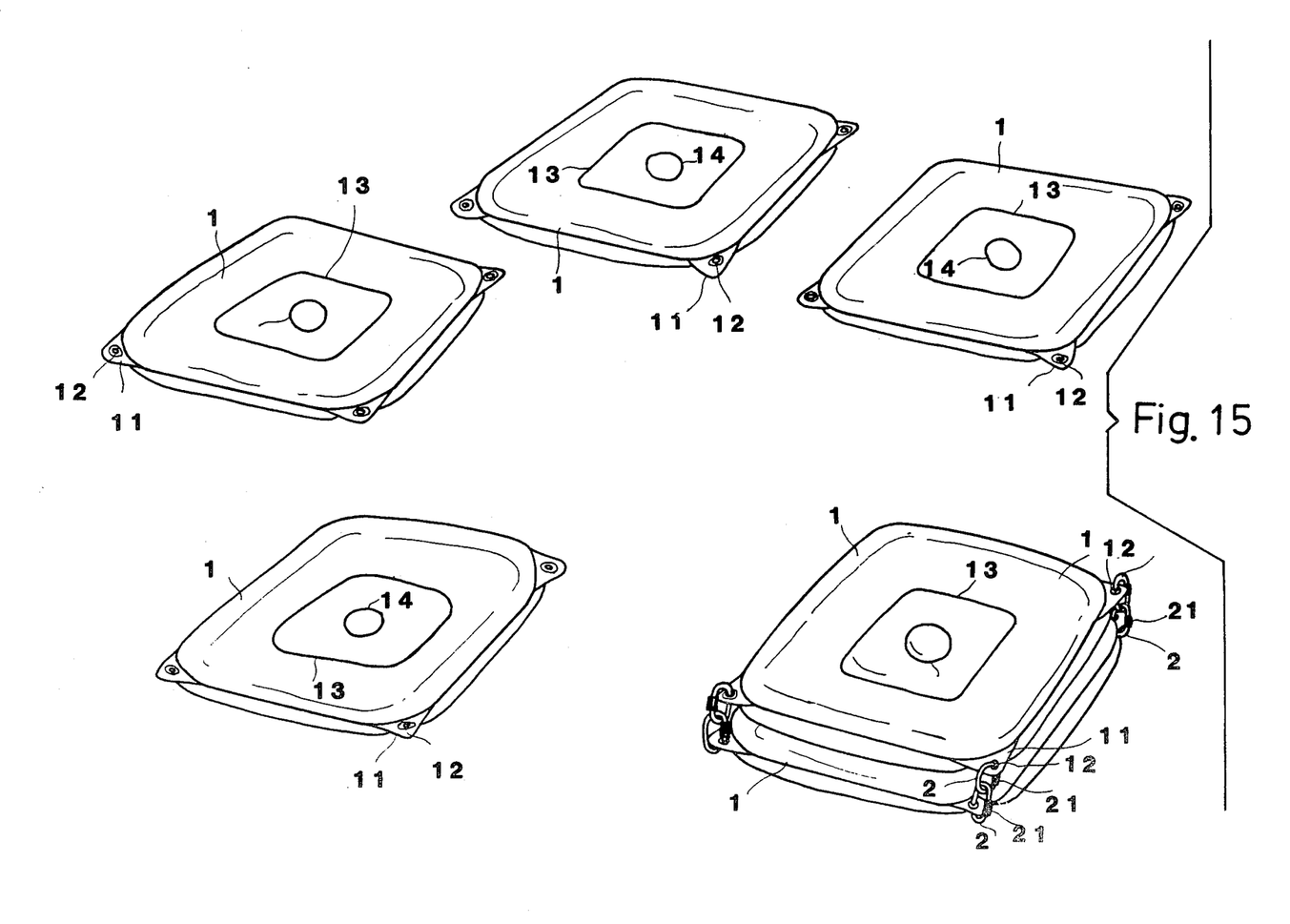
FIG. 15 shows an embodiment of this invention being used as a seat cushion.
Figure 16:
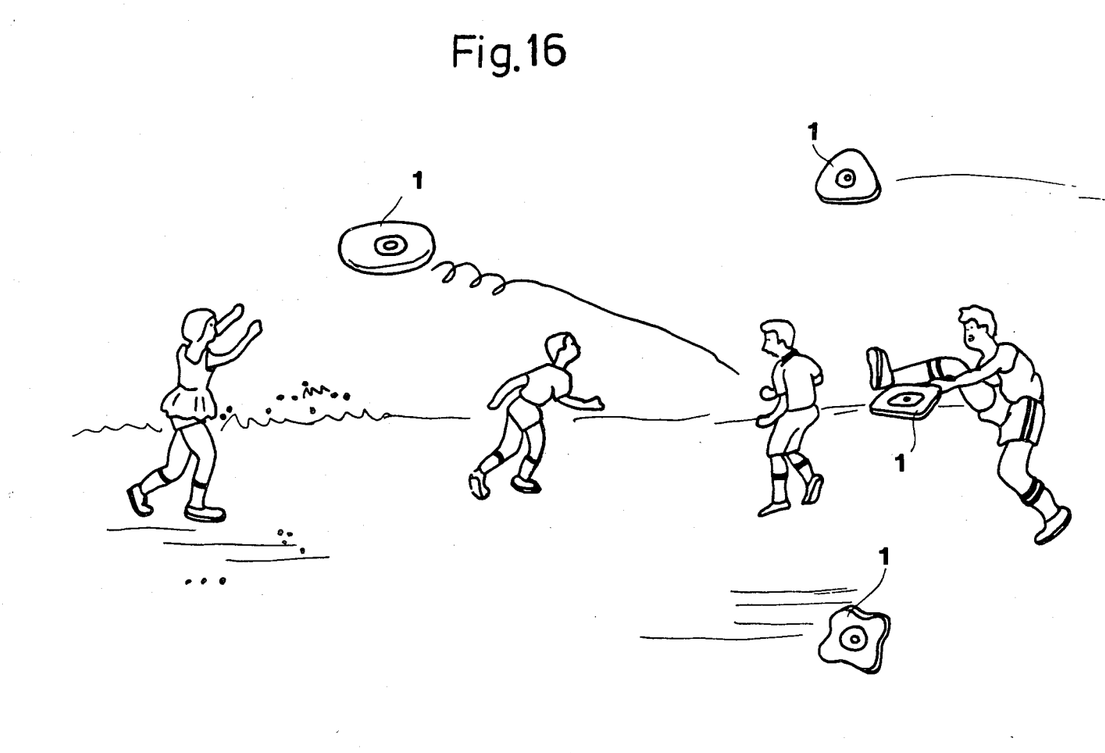
FIG. 16 shows an embodiment of flying saucer in this invention.

The lugs (11) furnished around the circumference of said cushion unit (1) are used for assembling in series, a plural number of cushion units (1). The assembling hole (12) as shown in FIG. 2-A & 2-B on said lug (11) should be so strong that it would not be damaged after two or more than two said cushion units (1) being assembled together in series with a hook ring (2) as shown in FIG. 4. The aforesaid assemblies in series thru said assembling holes (12) may be done with cord or link (3) as shown in FIG. 5, 5-1, & 5-2; however, in consideration of the strength and safety of the cushion unit assembly, it would be better to use said hook ring (2) and link (3). Said cushion units (1) may be assembled into various kinds of assemblies to be used on water or ground as a bed or a normal cushion as shown in FIG. 6 thru 13, among which FIG. 8 is an assembly made of cushions (1) in different shape, and FIG. 9 & 10 show some assembly embodiments of this invention; FIG. 11 shows an embodiment of life-jacket, and FIG. 13 shows an assembly embodiment of sun-shade be used either on the water or land. In addition to the aforesaid assemblies, this invention may be assembled into a pattern of assembly to fit any given purpose. A single cushion unit may be used as a chair cushion or foot cushion as shown in FIG. 14, or may be used as seat during excursion or camping. Since it is light and small in size, it is really a convenient portable and practical item. Further, this invention after being filled with air may also be used as a flying saucer for sports and recreation purposes as shown in FIG. 16. In other words, this invention can be used widely.

Figures 17, 18, 171:
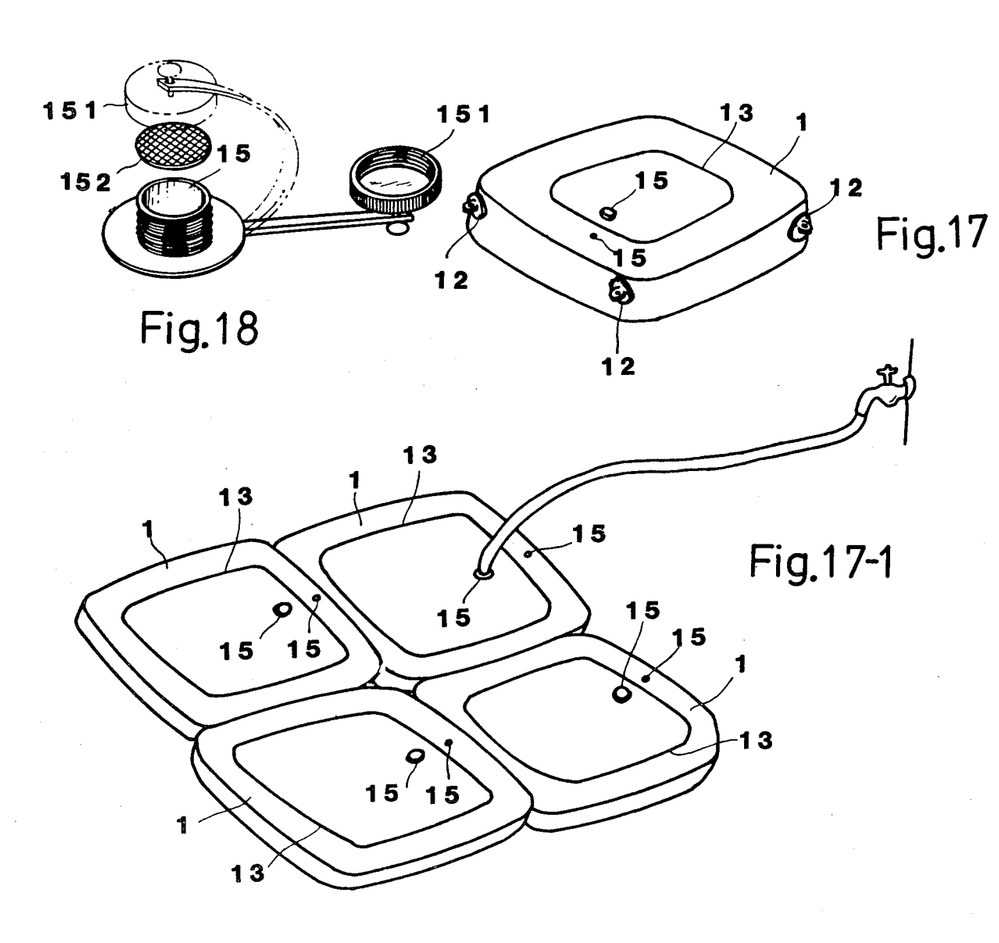
Figure 51:
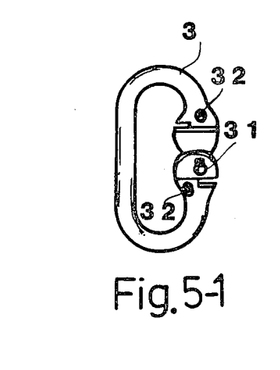
Figure 52:
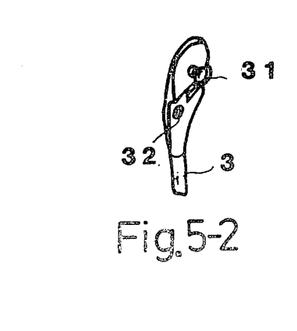
Figure 111:
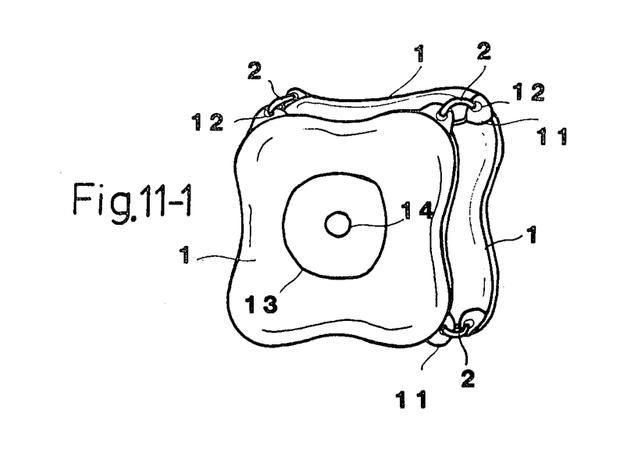
Figure 112:
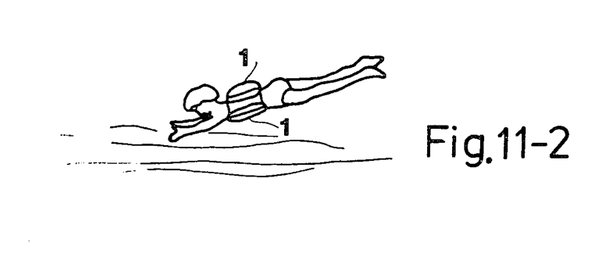
Figure 131:
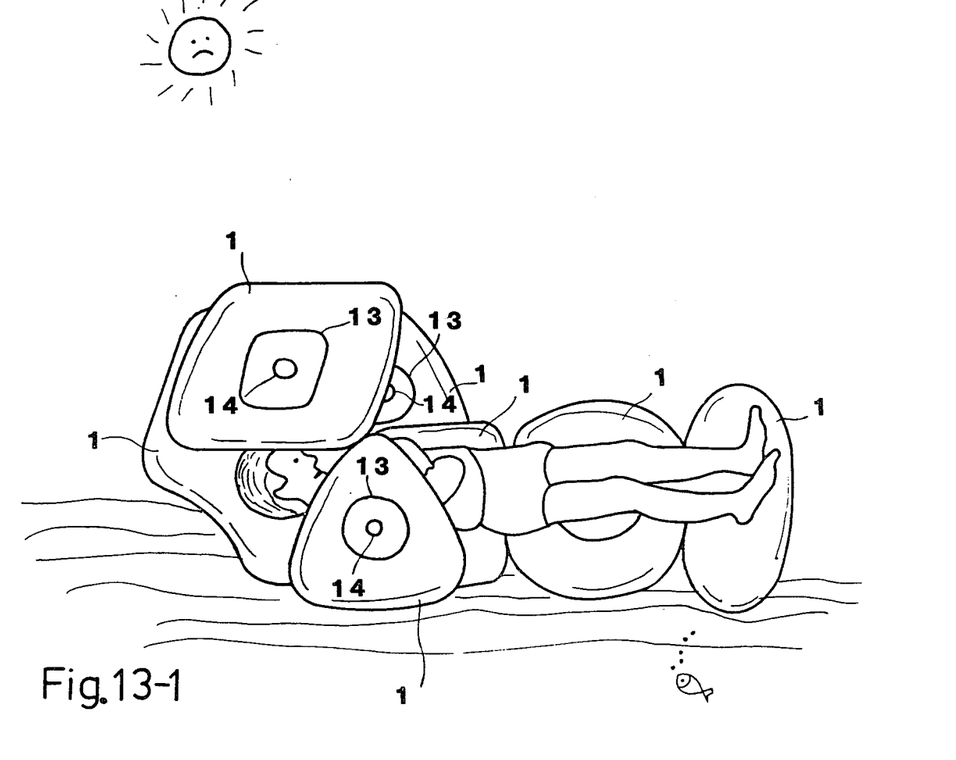
Figure 132:
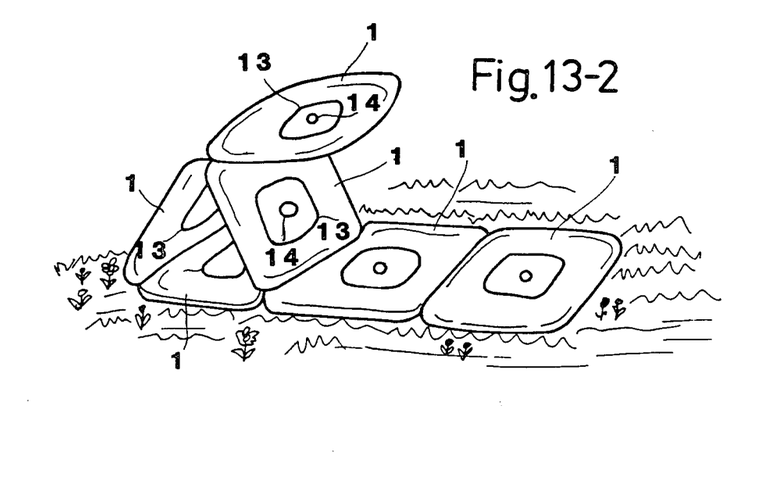

FIG. 17-1 shows another embodiment of this invention which is provided with a gusset soldered around its circumference with assembling hole (12) as shown in FIG. 17, and said gusset may also be used for the aforesaid cushion unit (1). In said embodiment, the I-beam band (13) partitions the cushion unit (1) into two non-interconnected chambers, and each of them has an intake (15, &15') different in shape and position. The outer chamber is designed to fill with air, while the inner chamber is designed to fill with water. As shown in FIG. 18, the intake (15') of said water chamber has a lid (151') with threads and a soft pad (152') for sealing the intake by means of thread lid to prevent water leak. The feature of said cushion unit is that since the water inside the inner chamber is surrounded with said air chamber, the cushion unit will have a stable effect because of the water unable to flow around; in addition, said water chamber surrounded by said air chamber will prevent the water from being heated by outer heat conduction; therefore, the cushion unit could have a better heat-proof effect, which is another feature of said embodiment. During hot summer time, said cushion unit may be assembled into a water bed to offer us comfortable summer time sleep. Since said cushion unit (1) can provide a considerable flexibility, softness, and comfort after being filled with 85-90% of air or water, it has approximately conformed with the principle of human engineering in the uses for seating, lying, etc.

The aforesaid hook ring (2) is designed in "⊏" shape, and at its both ends, some threads are furnished; between the two ends, a thread sleeve (21) is provided. When using it, rotate the thread sleeve (21) away from one end of said "⊏" shape hook ring (2), and hook it inside the assembling hole (12) of said lug (11); then, rotate said thread sleeve (21) back to close the opening of the hook ring (2). By that way, a plural number of cushion units (1) will be assembled in series to form a desired shape with better stability and safety. The link (3) mentioned above is made of plastics, and the two ends near the opening form into a semi-circular shape, and each end has a fastening stud (31) and a fastening stud hole (32) in corresponding position. When using it, each said fastening stud (31) will be inserted into the corresponding hole (32) in a cross linking manner with the other fastening stud as shown in FIG. 5.

Summing up the aforesaid descriptions, it is apparent that the multi-function cushions assembled not only have new patterns in shape, but also have many practical uses as follows:

(1) having versatile assembling variety to meet our requirements.

(2) able to be used on the water or the land with safety and better appearance.

(3) having longer life in use because of the I-beam band structure having strengthened its stability and impact-proof.

(4) convenient to carry, to fill air or water, and to operate.

(5) good for using either indoors or outdoors and also good for life-guard equipment, and sports equipment as well; it conforms with the economic principle of one-item for multi-purposes.

(6) in manufacturing, the size and the shape may be varied so as to meet various requirements.

I claim:

1. A portable multi-function cushion assembly comprising: a plurality of hollow inflatable square shaped cushions extending side by side in a contiguous array, each said cushion made up of a tough and flexible plastic material having (i) a centrally positioned circular I-beam band having passages therethrough disposed in adhering communication with a pair of opposing inside surfaces of each said cushion and (ii) a second I-beam band having passages therethrough disposed in adhering communication with said pair of opposing inside surfaces and surrounding said circular I-beam band,- providing means for adjusting to an external impact force applied to each said cushion to promote the stability thereof, a lug at each corner of each said cushion, each lug having a hole therethrough, adjacent respective corners of side by side cushions defining respective pairs of adjacent lugs, and intercushion connecting links, each said link disposable through a respective pair of said adjacent lugs, each said link having two ends forming an opening therebetween, said ends having flat semi-circular faces, releasably matable fastening studs and holes in each said face for closing said opening.

* * * * *